US011995318B2

(12) United States Patent
Seppanen et al.

(10) Patent No.: US 11,995,318 B2
(45) Date of Patent: *May 28, 2024

(54) DEALLOCATED BLOCK DETERMINATION

(71) Applicant: PURE STORAGE, INC., Mountain View, CA (US)

(72) Inventors: Eric D. Seppanen, Mountain View, CA (US); Neil Buda Vachharajani, Menlo Park, CA (US); Nidhi Pankaj Doshi, Menlo Park, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,880

(22) Filed: Apr. 6, 2023

(65) Prior Publication Data
US 2023/0244382 A1 Aug. 3, 2023

Related U.S. Application Data

(63) Continuation of application No. 17/401,436, filed on Aug. 13, 2021, now Pat. No. 11,640,244, which is a (Continued)

(51) Int. Cl.
G06F 12/00 (2006.01)
G06F 3/06 (2006.01)
G06F 12/02 (2006.01)

(52) U.S. Cl.
CPC .............. *G06F 3/061* (2013.01); *G06F 3/064* (2013.01); *G06F 3/0688* (2013.01); (Continued)

(58) Field of Classification Search
CPC ...... G06F 3/061; G06F 12/0246; G06F 3/064; G06F 3/0688; G06F 2212/7207; G06F 2212/7202; G06F 2212/1016
(Continued)

(56) References Cited

U.S. PATENT DOCUMENTS 5,390,327 A 2/1995 Lubbers et al.
5,450,581 A 9/1995 Bergen et al.
(Continued)

FOREIGN PATENT DOCUMENTS

EP 2164006 A2 3/2010
EP 2256621 A1 12/2010
(Continued)

OTHER PUBLICATIONS

Hwang et al., "RAID-x: A New Distributed Disk Array for I/O-Centric Cluster Computing", Proceedings of The Ninth International Symposium on High-performance Distributed Computing, Aug. 2000, pp. 279-286, The Ninth International Symposium on High-Performance Distributed Computing, IEEE Computer Society, Los Alamitos, CA.

(Continued)

Primary Examiner — Mardochee Chery

(57) ABSTRACT

A first data block on a storage device including a data structure of deallocated data blocks on the storage device and a corresponding program erase count value for each of the deallocated data blocks is identified. A determination as to whether a second data block from the data structure of deallocated data blocks remains deallocated after being added to the data structure of deallocated data blocks based on the program erase count value is made. The data is stored at the second data block upon determining that the second data block remains deallocated after being added to the data structure of deallocated data blocks.

20 Claims, 6 Drawing Sheets

Related U.S. Application Data continuation of application No. 16/655,792, filed on Oct. 17, 2019, now Pat. No. 11,119,657, which is a continuation of application No. 15/337,151, filed on Oct. 28, 2016, now Pat. No. 10,481,798.

(52) U.S. Cl.
CPC .. *G06F 12/0246* (2013.01); *G06F 2212/1016* (2013.01); *G06F 2212/7202* (2013.01); *G06F 2212/7207* (2013.01)

(58) Field of Classification Search
USPC .......................................................... 711/154
See application file for complete search history.

(56) References Cited

U.S. PATENT DOCUMENTS

| | | |
|---|---|---|
| 5,479,653 A | 12/1995 | Jones |
| 5,488,731 A | 1/1996 | Mendelsohn |
| 5,504,858 A | 4/1996 | Ellis et al. |
| 5,564,113 A | 10/1996 | Bergen et al. |
| 5,574,882 A | 11/1996 | Menon et al. |
| 5,649,093 A | 7/1997 | Hanko et al. |
| 5,883,909 A | 3/1999 | DeKoning et al. |
| 6,000,010 A | 12/1999 | Legg |
| 6,260,156 B1 | 7/2001 | Garvin et al. |
| 6,269,453 B1 | 7/2001 | Krantz |
| 6,275,898 B1 | 8/2001 | DeKoning |
| 6,453,428 B1 | 9/2002 | Stephenson |
| 6,523,087 B2 | 2/2003 | Busser |
| 6,535,417 B2 | 3/2003 | Tsuda et al. |
| 6,643,748 B1 | 11/2003 | Wieland |
| 6,725,392 B1 | 4/2004 | Frey et al. |
| 6,763,455 B2 | 7/2004 | Hall |
| 6,836,816 B2 | 12/2004 | Kendall |
| 6,985,995 B2 | 1/2006 | Holland et al. |
| 7,032,125 B2 | 4/2006 | Holt et al. |
| 7,047,358 B2 | 5/2006 | Lee et al. |
| 7,051,155 B2 | 5/2006 | Talagala et al. |
| 7,055,058 B2 | 5/2006 | Lee et al. |
| 7,065,617 B2 | 6/2006 | Wang |
| 7,069,383 B2 | 6/2006 | Yamamoto et al. |
| 7,076,606 B2 | 7/2006 | Orsley |
| 7,107,480 B1 | 9/2006 | Moshayedi et al. |
| 7,159,150 B2 | 1/2007 | Kenchammana-Hosekote et al. |
| 7,162,575 B2 | 1/2007 | Dalal et al. |
| 7,164,608 B2 | 1/2007 | Lee |
| 7,188,270 B1 | 3/2007 | Nanda et al. |
| 7,334,156 B2 | 2/2008 | Land et al. |
| 7,370,220 B1 | 5/2008 | Nguyen et al. |
| 7,386,666 B1 | 6/2008 | Beauchamp et al. |
| 7,398,285 B2 | 7/2008 | Kisley |
| 7,424,498 B1 | 9/2008 | Patterson |
| 7,424,592 B1 | 9/2008 | Karr et al. |
| 7,444,532 B2 | 10/2008 | Masuyama et al. |
| 7,480,658 B2 | 1/2009 | Heinla et al. |
| 7,484,056 B2 | 1/2009 | Madnani et al. |
| 7,484,057 B1 | 1/2009 | Madnani et al. |
| 7,484,059 B1 | 1/2009 | Ofer et al. |
| 7,536,506 B2 | 5/2009 | Ashmore et al. |
| 7,558,859 B2 | 7/2009 | Kasiolas et al. |
| 7,565,446 B2 | 7/2009 | Talagala et al. |
| 7,613,947 B1 | 11/2009 | Coatney et al. |
| 7,634,617 B2 | 12/2009 | Misra |
| 7,634,618 B2 | 12/2009 | Misra |
| 7,681,104 B1 | 3/2010 | Sim-Tang et al. |
| 7,681,105 B1 | 3/2010 | Sim-Tang et al. |
| 7,681,109 B2 | 3/2010 | Litsyn et al. |
| 7,730,257 B2 | 6/2010 | Franklin |
| 7,730,258 B1 | 6/2010 | Smith et al. |
| 7,730,274 B1 | 6/2010 | Usgaonkar |
| 7,743,276 B2 | 6/2010 | Jacobson et al. |
| 7,752,489 B2 | 7/2010 | Deenadhayalan et al. |
| 7,757,038 B2 | 7/2010 | Kitahara |
| 7,757,059 B1 | 7/2010 | Ofer et al. |
| 7,778,960 B1 | 8/2010 | Chatterjee et al. |
| 7,783,955 B2 | 8/2010 | Murin |
| 7,814,272 B2 | 10/2010 | Barrall et al. |
| 7,814,273 B2 | 10/2010 | Barrall |
| 7,818,531 B2 | 10/2010 | Barrall |
| 7,827,351 B2 | 11/2010 | Suetsugu et al. |
| 7,827,439 B2 | 11/2010 | Mathew et al. |
| 7,831,768 B2 | 11/2010 | Ananthamurthy et al. |
| 7,856,583 B1 | 12/2010 | Smith |
| 7,870,105 B2 | 1/2011 | Arakawa et al. |
| 7,873,878 B2 | 1/2011 | Belluomini et al. |
| 7,885,938 B1 | 2/2011 | Greene et al. |
| 7,886,111 B2 | 2/2011 | Klemm et al. |
| 7,908,448 B1 | 3/2011 | Chatterjee et al. |
| 7,916,538 B2 | 3/2011 | Jeon et al. |
| 7,921,268 B2 | 4/2011 | Jakob |
| 7,930,499 B2 | 4/2011 | Duchesne |
| 7,941,697 B2 | 5/2011 | Mathew et al. |
| 7,958,303 B2 | 6/2011 | Shuster |
| 7,971,129 B2 | 6/2011 | Watson et al. |
| 7,975,115 B2 | 7/2011 | Wayda et al. |
| 7,984,016 B2 | 7/2011 | Kisley |
| 7,991,822 B2 | 8/2011 | Bish et al. |
| 8,006,126 B2 | 8/2011 | Deenadhayalan et al. |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,046,548 B1 | 10/2011 | Chatterjee et al. |
| 8,051,361 B2 | 11/2011 | Sim-Tang et al. |
| 8,051,362 B2 | 11/2011 | Li et al. |
| 8,074,038 B2 | 12/2011 | Lionetti et al. |
| 8,082,393 B2 | 12/2011 | Galloway et al. |
| 8,086,603 B2 | 12/2011 | Nasre et al. |
| 8,086,634 B2 | 12/2011 | Mimatsu |
| 8,086,911 B1 | 12/2011 | Taylor |
| 8,090,837 B2 | 1/2012 | Shin et al. |
| 8,108,502 B2 | 1/2012 | Tabbara et al. |
| 8,117,388 B2 | 2/2012 | Jernigan, IV |
| 8,117,521 B2 | 2/2012 | Parker et al. |
| 8,140,821 B1 | 3/2012 | Raizen et al. |
| 8,145,838 B1 | 3/2012 | Miller et al. |
| 8,145,840 B2 | 3/2012 | Koul et al. |
| 8,175,012 B2 | 5/2012 | Chu et al. |
| 8,176,360 B2 | 5/2012 | Frost et al. |
| 8,176,405 B2 | 5/2012 | Hafner et al. |
| 8,180,855 B2 | 5/2012 | Aiello et al. |
| 8,200,922 B2 | 6/2012 | McKean et al. |
| 8,209,469 B2 | 6/2012 | Carpenter et al. |
| 8,225,006 B1 | 7/2012 | Karamcheti |
| 8,239,618 B2 | 8/2012 | Kotzur et al. |
| 8,244,999 B1 | 8/2012 | Chatterjee et al. |
| 8,261,016 B1 | 9/2012 | Goel |
| 8,271,455 B2 | 9/2012 | Kesselman |
| 8,285,686 B2 | 10/2012 | Kesselman |
| 8,305,811 B2 | 11/2012 | Jeon |
| 8,315,999 B2 | 11/2012 | Chatley et al. |
| 8,327,080 B1 | 12/2012 | Der |
| 8,335,769 B2 | 12/2012 | Kesselman |
| 8,341,118 B2 | 12/2012 | Drobychev et al. |
| 8,351,290 B1 | 1/2013 | Huang et al. |
| 8,364,920 B1 | 1/2013 | Parkison et al. |
| 8,365,041 B2 | 1/2013 | Olbrich et al. |
| 8,375,146 B2 | 2/2013 | Sinclair |
| 8,397,016 B2 | 3/2013 | Talagala et al. |
| 8,402,152 B2 | 3/2013 | Duran |
| 8,412,880 B2 | 4/2013 | Leibowitz et al. |
| 8,423,739 B2 | 4/2013 | Ash et al. |
| 8,429,436 B2 | 4/2013 | Fillingim et al. |
| 8,452,928 B1 | 5/2013 | Ofer et al. |
| 8,473,698 B2 | 6/2013 | Lionetti et al. |
| 8,473,778 B2 | 6/2013 | Simitci et al. |
| 8,473,815 B2 | 6/2013 | Chung et al. |
| 8,479,037 B1 | 7/2013 | Chatterjee et al. |
| 8,484,414 B2 | 7/2013 | Sugimoto et al. |
| 8,498,967 B1 | 7/2013 | Chatterjee et al. |
| 8,504,797 B2 | 8/2013 | Mimatsu |
| 8,522,073 B2 | 8/2013 | Cohen |
| 8,533,408 B1 | 9/2013 | Madnani et al. |

(56) References Cited

U.S. PATENT DOCUMENTS

| | | |
|---|---|---|
| 8,533,527 B2 | 9/2013 | Daikokuya et al. |
| 8,539,177 B1 | 9/2013 | Madnani et al. |
| 8,544,029 B2 | 9/2013 | Bakke et al. |
| 8,549,224 B1 | 10/2013 | Zeryck et al. |
| 8,583,861 B1 | 11/2013 | Ofer et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |
| 8,627,138 B1 | 1/2014 | Clark et al. |
| 8,639,669 B1 | 1/2014 | Douglis et al. |
| 8,639,863 B1 | 1/2014 | Kanapathippillai et al. |
| 8,640,000 B1 | 1/2014 | Cypher |
| 8,650,343 B1 | 2/2014 | Kanapathippillai et al. |
| 8,660,131 B2 | 2/2014 | Vermunt et al. |
| 8,661,218 B1 | 2/2014 | Piszczek et al. |
| 8,671,072 B1 | 3/2014 | Shah et al. |
| 8,689,042 B1 | 4/2014 | Kanapathippillai et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey, Jr. et al. |
| 8,719,621 B1 | 5/2014 | Karmarkar |
| 8,725,730 B2 | 5/2014 | Keeton et al. |
| 8,751,859 B2 | 6/2014 | Becker-Szendy et al. |
| 8,756,387 B2 | 6/2014 | Frost et al. |
| 8,762,793 B2 | 6/2014 | Grube et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,822,155 B2 | 9/2014 | Sukumar et al. |
| 8,824,261 B1 | 9/2014 | Miller et al. |
| 8,832,528 B2 | 9/2014 | Thatcher et al. |
| 8,838,541 B2 | 9/2014 | Camble et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes et al. |
| 8,874,836 B1 | 10/2014 | Hayes et al. |
| 8,880,793 B2 | 11/2014 | Nagineni |
| 8,880,825 B2 | 11/2014 | Lionetti et al. |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 | 4/2015 | Hayes et al. |
| 9,009,724 B2 | 4/2015 | Gold et al. |
| 9,021,053 B2 | 4/2015 | Bembo et al. |
| 9,021,215 B2 | 4/2015 | Meir et al. |
| 9,025,393 B2 | 5/2015 | Wu et al. |
| 9,043,372 B2 | 5/2015 | Makkar et al. |
| 9,047,214 B1 | 6/2015 | Northcott |
| 9,053,808 B2 | 6/2015 | Sprouse et al. |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon et al. |
| 9,122,401 B2 | 9/2015 | Zaltsman et al. |
| 9,123,422 B2 | 9/2015 | Yu et al. |
| 9,124,300 B2 | 9/2015 | Sharon et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma et al. |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman |
| 9,280,678 B2 | 3/2016 | Redberg |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B1 | 4/2016 | Karamcheti et al. |
| 9,311,969 B2 | 4/2016 | Sharon et al. |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,395,922 B2 | 7/2016 | Nishikido et al. |
| 9,396,202 B1 | 7/2016 | Drobychev et al. |
| 9,400,828 B2 | 7/2016 | Kesselman et al. |
| 9,405,478 B2 | 8/2016 | Koseki et al. |
| 9,411,685 B2 | 8/2016 | Lee |
| 9,417,960 B2 | 8/2016 | Cai et al. |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Hayes et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,552,248 B2 | 1/2017 | Miller et al. |
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B1 | 3/2017 | Sathiamoorthy et al. |
| 9,600,193 B2 | 3/2017 | Ahrens et al. |
| 9,619,321 B1 | 4/2017 | Haratsch et al. |
| 9,619,430 B2 | 4/2017 | Kannan et al. |
| 9,645,754 B2 | 5/2017 | Li et al. |
| 9,667,720 B1 | 5/2017 | Bent et al. |
| 9,710,535 B2 | 7/2017 | Aizman et al. |
| 9,733,840 B2 | 8/2017 | Karamcheti et al. |

(56) References Cited

U.S. PATENT DOCUMENTS

| | | |
|---|---|---|
| 9,734,225 B2 | 8/2017 | Akirav et al. |
| 9,740,403 B2 | 8/2017 | Storer et al. |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B1 | 10/2017 | Singh |
| 9,804,925 B1 | 10/2017 | Carmi et al. |
| 9,811,285 B1 | 11/2017 | Karamcheti et al. |
| 9,811,546 B1 | 11/2017 | Bent et al. |
| 9,818,478 B2 | 11/2017 | Chung |
| 9,829,066 B2 | 11/2017 | Thomas et al. |
| 9,836,245 B2 | 12/2017 | Hayes et al. |
| 9,891,854 B2 | 2/2018 | Munetoh et al. |
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,952,809 B2 | 4/2018 | Shah |
| 9,959,167 B1 | 5/2018 | Donlan et al. |
| 9,965,539 B2 | 5/2018 | D'Halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Yang et al. |
| 10,019,317 B2 | 7/2018 | Usvyatsky et al. |
| 10,031,703 B1 | 7/2018 | Natanzon et al. |
| 10,061,512 B2 | 8/2018 | Lin |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Yang |
| 10,089,176 B1 | 10/2018 | Donlan et al. |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Yang et al. |
| 10,162,704 B1 | 12/2018 | Kirschner et al. |
| 10,180,875 B2 | 1/2019 | Klein |
| 10,185,730 B2 | 1/2019 | Bestler et al. |
| 10,235,065 B1 | 3/2019 | Miller et al. |
| 10,324,639 B2 | 6/2019 | Seo |
| 10,481,798 B2 | 11/2019 | Doshi et al. |
| 10,567,406 B2 | 2/2020 | Astigarraga et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,119,657 B2 | 9/2021 | Doshi et al. |
| 11,194,707 B2 | 12/2021 | Stalzer |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0256141 A1 | 10/2008 | Wayda et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0223423 A1* | 9/2010 | Sinclair ............ G06F 3/0679 711/E12.001 |
| 2010/0268908 A1 | 10/2010 | Ouyang et al. |
| 2010/0306500 A1 | 12/2010 | Mimatsu |
| 2011/0035540 A1 | 2/2011 | Fitzgerald et al. |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt et al. |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight et al. |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats et al. |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healey, Jr. et al. |
| 2013/0151653 A1 | 6/2013 | Sawicki et al. |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0339314 A1 | 12/2013 | Carpentier et al. |
| 2013/0339635 A1 | 12/2013 | Amit et al. |
| 2013/0339818 A1 | 12/2013 | Baker et al. |
| 2014/0040535 A1 | 2/2014 | Lee et al. |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0122510 A1 | 5/2014 | Namkoong et al. |
| 2014/0136880 A1 | 5/2014 | Shankar et al. |
| 2014/0181402 A1 | 6/2014 | White |
| 2014/0220561 A1 | 8/2014 | Sukumar et al. |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0330785 A1 | 11/2014 | Isherwood et al. |
| 2014/0372838 A1 | 12/2014 | Lou et al. |

(56) References Cited

U.S. PATENT DOCUMENTS

| | | |
|---|---|---|
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik et al. |
| 2015/0134824 A1 | 5/2015 | Mickens et al. |
| 2015/0153800 A1 | 6/2015 | Lucas et al. |
| 2015/0154418 A1 | 6/2015 | Redberg |
| 2015/0180714 A1 | 6/2015 | Chunn et al. |
| 2015/0280959 A1 | 10/2015 | Vincent |
| 2016/0026397 A1 | 1/2016 | Nishikido et al. |
| 2016/0182542 A1 | 6/2016 | Staniford |
| 2016/0191508 A1 | 6/2016 | Bestler et al. |
| 2016/0246537 A1 | 8/2016 | Kim |
| 2016/0248631 A1 | 8/2016 | Duchesneau |
| 2016/0378612 A1 | 12/2016 | Hipsh et al. |
| 2017/0091236 A1 | 3/2017 | Hayes et al. |
| 2017/0103092 A1 | 4/2017 | Hu et al. |
| 2017/0103094 A1 | 4/2017 | Hu et al. |
| 2017/0103098 A1 | 4/2017 | Hu et al. |
| 2017/0103116 A1 | 4/2017 | Hu et al. |
| 2017/0177236 A1 | 6/2017 | Haratsch et al. |
| 2017/0262202 A1 | 9/2017 | Seo |
| 2018/0039442 A1 | 2/2018 | Shadrin et al. |
| 2018/0054454 A1 | 2/2018 | Astigarraga et al. |
| 2018/0081958 A1 | 3/2018 | Akirav et al. |
| 2018/0101441 A1 | 4/2018 | Hyun et al. |
| 2018/0101587 A1 | 4/2018 | Anglin et al. |
| 2018/0101588 A1 | 4/2018 | Anglin et al. |
| 2018/0217756 A1 | 8/2018 | Liu et al. |
| 2018/0307560 A1 | 10/2018 | Vishnumolakala et al. |
| 2018/0321874 A1 | 11/2018 | Li et al. |
| 2019/0036703 A1 | 1/2019 | Bestler |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0360833 A1 | 11/2021 | Alissa et al. |

FOREIGN PATENT DOCUMENTS

| | | |
|---|---|---|
| WO | 0213033 A1 | 2/2002 |
| WO | 2008103569 A1 | 8/2008 |
| WO | 2008157081 A2 | 12/2008 |
| WO | 2013032825 A2 | 3/2013 |

OTHER PUBLICATIONS

International Search Report and Written Opinion, PCT/US2015/018169, dated May 15, 2015, 10 pages.
International Search Report and Written Opinion, PCT/US2015/034291, dated Sep. 30, 2015, 3 pages.
International Search Report and Written Opinion, PCT/US2015/034302, dated Sep. 11, 2015, 10 pages.
International Search Report and Written Opinion, PCT/US2015/039135, dated Sep. 18, 2015, 8 pages.
International Search Report and Written Opinion, PCT/US2015/039136, dated Sep. 23, 2015, 7 pages.
International Search Report and Written Opinion, PCT/US2015/039137, dated Oct. 1, 2015, 8 pages.
International Search Report and Written Opinion, PCT/US2015/039142, dated Sep. 24, 2015, 3 pages.
International Search Report and Written Opinion, PCT/US2015/044370, dated Dec. 15, 2015, 3 pages.
International Search Report and Written Opinion, PCT/US2016/014356, dated Jun. 28, 2016, 3 pages.
International Search Report and Written Opinion, PCT/US2016/014357, dated Jun. 29, 2016, 3 pages.
International Search Report and Written Opinion, PCT/US2016/014361, dated May 30, 2016, 3 pages.
International Search Report and Written Opinion, PCT/US2016/014604, dated May 19, 2016, 3 pages.
International Search Report and Written Opinion, PCT/US2016/016504, dated Jul. 6, 2016, 7 pages.
International Search Report and Written Opinion, PCT/US2016/023485, dated Jul. 21, 2016, 13 pages.
International Search Report and Written Opinion, PCT/US2016/024391, dated Jul. 12, 2016, 11 pages.
International Search Report and Written Opinion, PCT/US2016/026529, dated Jul. 19, 2016, 9 pages.
International Search Report and Written Opinion, PCT/US2016/031039, dated Aug. 18, 2016, 7 pages.
International Search Report and Written Opinion, PCT/US2016/033306, dated Aug. 19, 2016, 11 pages.
International Search Report and Written Opinion, PCT/US2016/047808, dated Nov. 25, 2016, 14 pages.
Kim et al., "Data Access Frequency based Data Replication Method using Erasure Codes in Cloud Storage System", Journal of the Institute of Electronics and Information Engineers, Feb. 2014, vol. 51, No. 2, 7 pages.
Schmid, "RAID Scaling Charts, Part 3:4-128 KB Stripes Compared", Tom's Hardware, Nov. 27, 2007, URL: http://www.tomshardware.com/reviews/RAID-SCALING-CHARTS.1735-4.html, 24 pages.
Stalzer, "FlashBlades: System Architecture and Applications", Proceedings of the 2nd Workshop on Architectures and Systems for Big Data, Jun. 2012, pp. 10-14, Association for Computing Machinery, New York, NY.
Storer et al., "Pergamum: Replacing Tape with Energy Efficient, Reliable, Disk-Based Archival Storage", FAST'08: Proceedings of the 6th USENIX Conference on File and Storage Technologies, Article No. 1, Feb. 2008, pp. 1-16, USENIX Association, Berkeley, CA.

\* cited by examiner

DEALLOCATED BLOCK DETERMINATION

CROSS REFERENCE TO RELATED APPLICATIONS

This is a continuation application for patent entitled to a filing date and claiming the benefit of earlier-filed U.S. patent application Ser. No. 17/401,436, filed Aug. 13, 2021, which is a continuation of U.S. Pat. No. 11,119,657, issued Sep. 14, 2021, which is a continuation of U.S. Pat. No. 10,481,798, issued Nov. 19, 2019, each of which are hereby incorporated by reference in their entirety.

BACKGROUND

As computer memory storage and data bandwidth increase, so does the amount and complexity of data that businesses manage daily. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

BRIEF DESCRIPTION OF THE DRAWINGS

The present disclosure is illustrated by way of example, and not by way of limitation, in the figures of the accompanying drawings.

DETAILED DESCRIPTION

Figure 1:
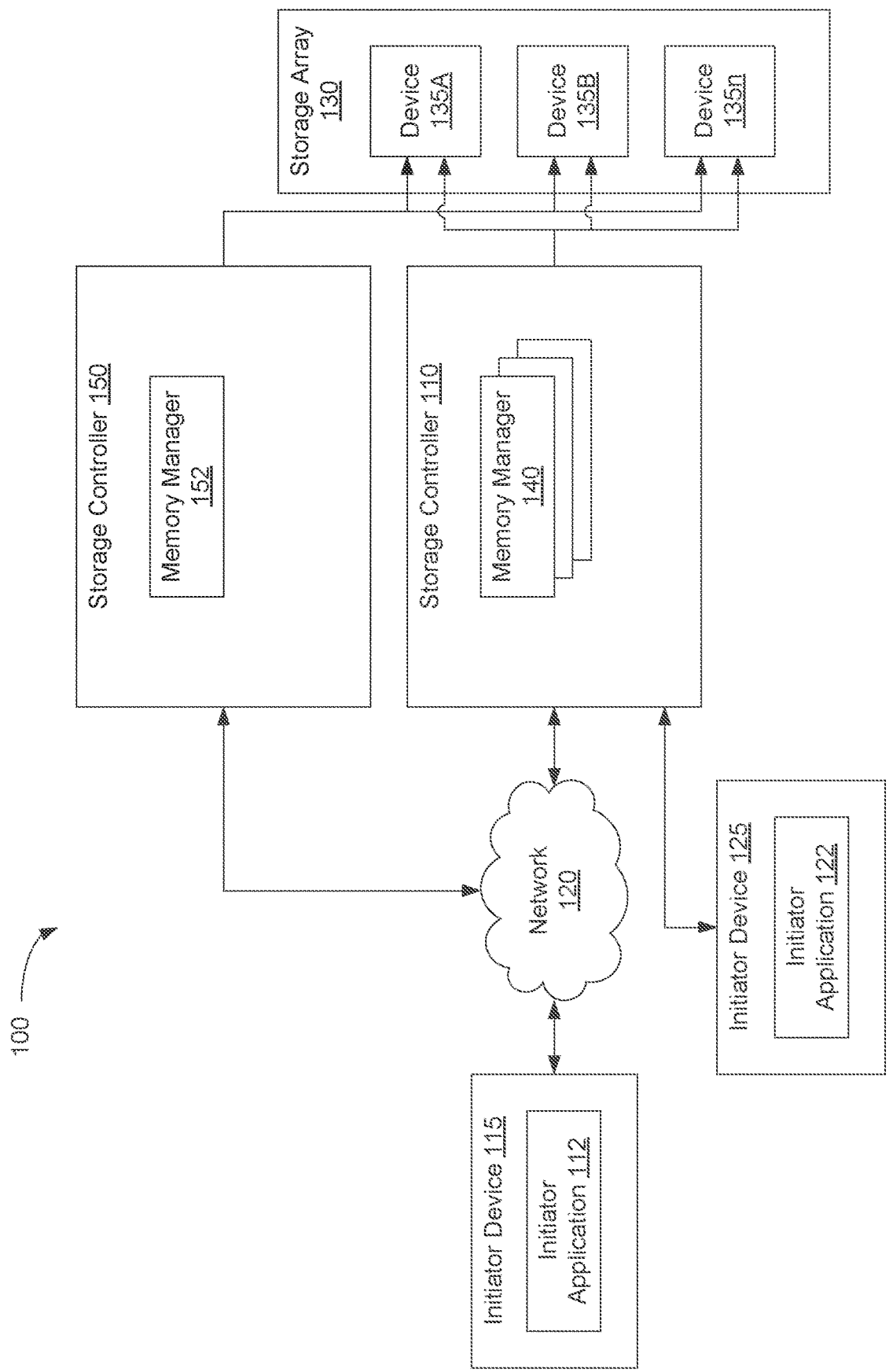
FIG. 1 is a block diagram illustrating a storage system in which embodiments of the present disclosure may be implemented.

Embodiments are described for efficient flash management for multiple controllers. In one embodiment, a memory manager module running on a storage controller utilizes physical block addressing rather than logical addressing to manage the data stored on the underlying storage devices in a connected storage array. The memory manager may abide by certain principles including having no preference for particular physical addresses, such that data does not have a "primary" location, "secondary" location, etc., but rather is just scattered randomly about the drive. Another principle of operations is not trying to write a "trickle" of tiny metadata updates because as the drive's state evolves, it may be best to use only the metadata persisted into flash blocks, along with periodically persisted data managed by the memory manager.

In one embodiment, the memory manager described herein achieves these principles by meeting at least three individual objectives. First, the memory manager allows a fast start of the primary storage controller by quickly locating recently-written flash blocks of one or more types of data. Second, the memory manager provides a list of flash blocks that are deallocated and ready for client writes. Third, the memory manager respects the needs of modern flash devices by delaying the erase of flash blocks until just before those blocks are needed for writing.

To accomplish the above objectives, the memory manager works in connection with firmware in the underlying storage devices. In one embodiment, the storage device firmware implements a metadata tracking scheme that stores certain values along with any data payload. These values may include a program/erase count for each data block that indicates a number of cycles during which the block has been written and erased, and a block type value, which may identify a storage client that owns the data in that block. In addition, the storage device firmware maintains a table or other data structure containing data for each data block and allows the memory manager to access the table. For each data block, the table also stores the program/erase count, the block type value, and a block status indicator (erased, written, unreadable, bad, etc.). On power-up of the storage device, the firmware may scan the data blocks to recover the embedded metadata and populate the data structure with the metadata recovered from those blocks.

The memory manager manages blocks in concert with a data structure called the "frontier set." The frontier set is a data structure that is written to flash that declares the state of a storage device in a way that allows future readers to determine not only what was true at that point in time, but also to recover the effect of operations that occurred after the frontier set was written to flash. The frontier set, in its most primitive form, is simply a list of block numbers and their corresponding program/erase counts. This is a declaration that at the moment the frontier set was created, block X was deallocated when its program/erase count was Y. The memory manager can use the frontier set to extrapolate the state of a block beyond the moment the frontier set was created and written. If block X was deallocated when its program/erase count was Y, the memory manager can make at least two logical conclusions. First, a future reader that finds block X still at program/erase count Y can conclude that block must still be deallocated. Second, a future reader that finds block X at some program/erase count Z>Y can conclude that some client must have written new data to that block, after this frontier set was created or updated.

As explained herein, these conclusions allow the memory manager to achieve the objectives described above. As long as the memory manager writes a new frontier set periodically (and sufficient blocks remain available), it is possible to allow the controller to discover known deallocated blocks that are ready for new writes. In addition, erases can be delayed until just before the blocks are rewritten because block deallocation will be "eventually consistent." This means that a deallocated block may not be seen as deallocated by all possible future primary controllers since it's possible that deallocated blocks may revert to the allocated state, until the next frontier set is persisted. Deallocated blocks are available for reuse, but until the moment that their new owner actually writes to them (which implies that the embedded metadata will include a new program/erase count and block type value), that block may revert back to its previous owner. Furthermore, a fast start of the primary controller is achieved by locating the leading edge of newly written data from a particular client. To assist a major client storing on the order of 100,000 to 1,000,000 blocks or more, the memory manager can define two classes of data, or more precisely, two states that a data block can be in. A "boot" block is one that contains new data and a "standalone" block contains cold data (i.e., data that has been around and untouched for a certain period of time). Boot blocks can be quickly and efficiently enumerated by memory manager to the client, after a crash or power loss. When the client no longer requires this block to be enumerated as a boot block, it will indicate this to the memory manager (a process referred to as "graduation"). This block will then become a standalone block at the memory manager's discretion.

FIG. 1 is a block diagram illustrating a storage system 100 in which embodiments of the present disclosure may be implemented. Storage system 100 may include storage controllers 110, 150 and storage array 130, which is representative of any number of data storage arrays or storage device groups. As shown, storage array 130 includes storage devices 135A-n, which are representative of any number and type of storage devices (e.g., solid-state drives (SSDs)). Storage controller 110 may be coupled directly to initiator device 125 and storage controller 110 may be coupled remotely over network 120 to initiator device 115. In one embodiment, storage controller 150 is coupled remotely over network 120 to initiator device 115. Initiator devices 115 and 125 are representative of any number of clients which may utilize storage controllers 110 and 150 for storing and accessing data in storage system 100. It is noted that some systems may include only a single client or initiator device, connected directly or remotely, to storage controllers 110 and 150.

In one embodiment, controller 110 is designated as the "primary" controller, which performs most or all of the I/O operations on the array 130. If, however, a software crash, hardware fault or other error occurs, the "secondary" controller 150 may be promoted to serve as the primary controller and take over all responsibilities for servicing the array 130. In one embodiment, storage controllers 110 and 150 are identical and any description of controller 110 herein may be equally attributed to storage controller 150.

Storage controller 110 may include software and/or hardware configured to provide access to storage devices 135A-n. Although storage controller 110 is shown as being separate from storage array 130, in some embodiments, storage controller 110 may be located within storage array 130. Storage controller 110 may include or be coupled to a base operating system (OS), a volume manager, and additional control logic, such as memory manager 140, for implementing the various techniques disclosed herein. In one embodiment, the OS is designed with flash storage in mind, so while it can use conventional SSDs to store data, it does not depend on a 512 byte random overwrite capability. Even on conventional SSDs, storage controller 110 can achieve better performance by writing and discarding data in large chunks. This style of I/O is sometimes called "flash friendly I/O." This also makes it a much easier task to convert the OS to use the physical addressing of storage devices, as compared to conventional filesystems.

In one embodiment, the logic of memory manager 140 is contained within an object which manages one of devices 135A-n. Thus, there may be a separate memory manager object for each device 135A-n in storage array 130. As new devices are connected to controller 110, new memory manager objects may be created. These objects may be similarly discarded when a corresponding device is disconnected from storage controller 110. Clients wishing to communicate with memory manager 140, such as one of initiator applications 112, 122, the operating system running on storage controller 110 or another client application running on storage controller 110, may do so via a memory manager application programming interface (API) published by memory manager 140. In one embodiment, multiple clients can access the same memory manager object concurrently. In one embodiment, storage controller 150 includes a separate instance(s) of memory manager 152.

Storage controller 110 may include and/or execute on any number of processing devices and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-n to prevent loss of data due to the failure of a device or the failure of storage locations within a device. Storage controller 110 may also utilize any of various deduplication techniques for reducing the amount of data stored in devices 135A-n by deduplicating common data.

In one embodiment, storage controller 110 may utilize logical volumes and mediums to track client data that is stored in storage array 130. A medium is defined as a logical grouping of data, and each medium has an identifier with which to identify the logical grouping of data. A volume is a single accessible storage area with a single file system, typically, though not necessarily, resident on a single partition of a storage device. The volumes may be logical organizations of data physically located on one or more of storage device 135A-n in storage array 130. Storage controller 110 may maintain a volume to medium mapping table to map each volume to a single medium, and this medium is referred to as the volume's anchor medium. A given request received by storage controller 110 may indicate at least a volume and block address or file name, and storage controller 110 may determine an anchor medium targeted by the given request from the volume to medium mapping table.

In one embodiment, storage controller 110 includes memory manager 140. Memory manager 140 can perform various operations to identify deallocated data blocks available for writing and to identify leading edge data that was most recently written by a particular client. In one embodiment, memory manager 140 can receive a request to write data to a storage device 135A and can determine a first data block on storage device 135A comprising a list of deallocated data blocks. That list may include a block number of each deallocated data block and an access operation count value (e.g., program/erase count value) at which each deallocated data block was deallocated. Memory manager 140 can then identify a second data block from the list of deallocated data blocks and write the requested data to that second data block. To identify the leading edge data, memory manager 140 may access a data structure stored in memory on storage device 135A, where the data structure stores block metadata for each data block on storage device 135A. Memory manager 140 may determine, from the data structure, a first data block on storage device 135A comprising a list of deallocated data blocks on the storage device and compare a first access operation count value associated with each of the deallocated data blocks from the data structure to a second access operation count value associated with each of the deallocated data blocks from the list of deallocated data blocks. Memory manager 140 may label a second data block on the list as comprising new data responsive to the first access operation count value associated with the second data block from the data structure not matching the second access operation count value associated with the second data block from the list of deallocated data blocks.

In various embodiments, multiple mapping tables may be maintained by storage controller 110. These mapping tables may include a medium mapping table and a volume to medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the initiator devices 115 and 125 to physical locations in storage devices 135A-n. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-n. The physical pointer value may be used to access another mapping table within a given storage device of the storage devices 135A-n. Consequently, one or more levels of indirection may exist between the physical pointer value and a target storage location.

In alternative embodiments, the number and type of client computers, initiator devices, storage controllers, networks, storage arrays, and data storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connections, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the devices 135A-n appear to the initiator devices 115 and 125 as locally attached storage.

Initiator devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, initiator devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, initiator device 115 includes initiator application 112 and initiator device 125 includes initiator application 122. Initiator applications 112 and 122 may be any computer application programs designed to utilize the data on devices 135A-n in storage array 130 to implement or provide various functionalities. Initiator applications 112 and 122 may issue requests to read or write data from certain logical volumes data within storage system 100. Those requests can be serviced by memory manager 140 of storage controller 110, as described in detail herein.

Figure 2:
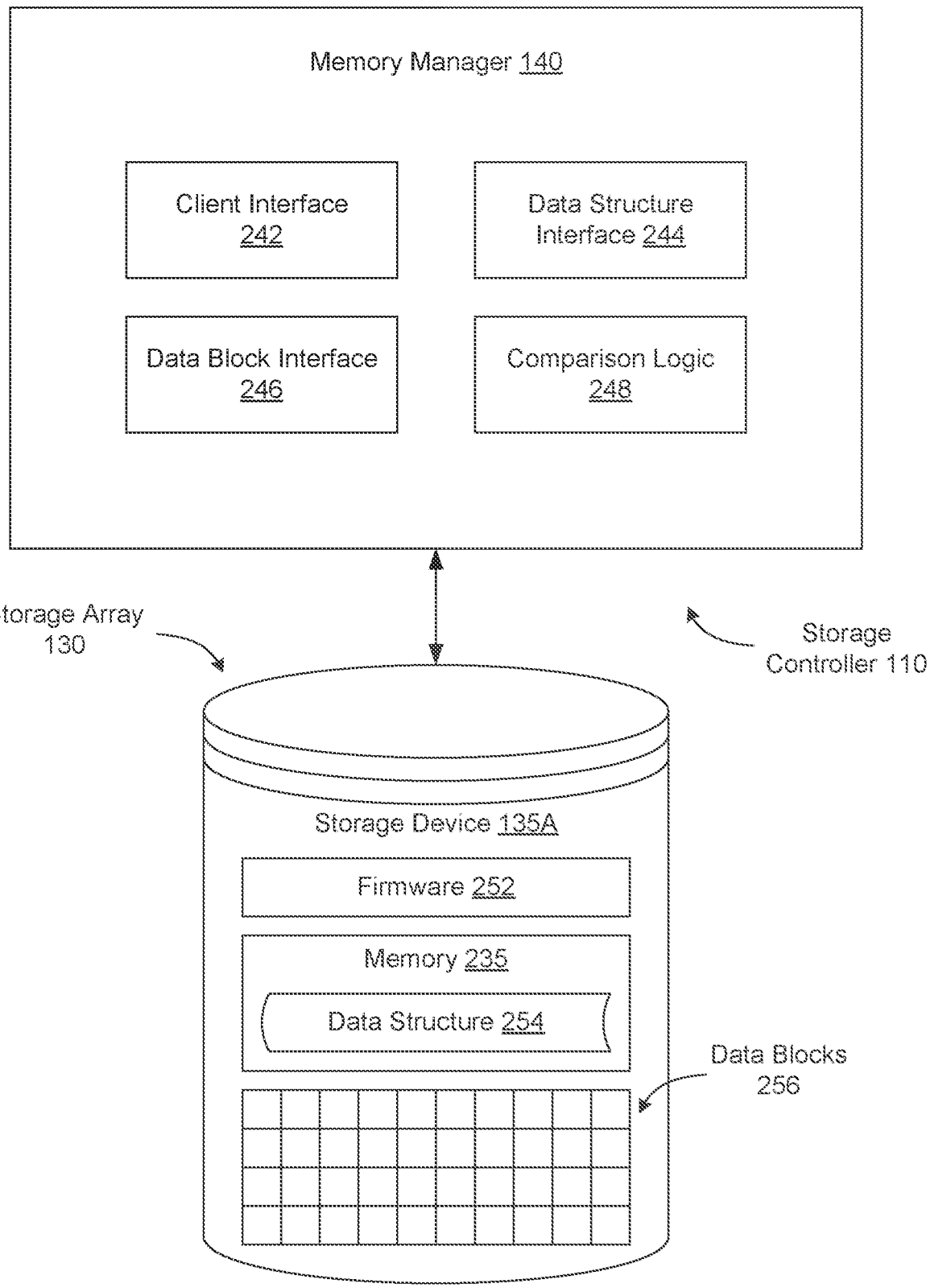
FIG. 2 is a block diagram illustrating a memory manager in a storage controller, according to an embodiment.

FIG. 2 is a block diagram illustrating memory manager 140 in a storage controller 110, according to an embodiment. In one embodiment, memory manager 140 includes client interface 242, data structure interface 244, data block interface 246 and comparison logic 248. This arrangement of modules may be a logical separation, and in other embodiments, these modules, interfaces or other components can be combined together or separated in further components. In one embodiment, storage device 135A is connected to memory manager 140 and includes firmware 252, memory 235 storing data structure 254, and data blocks 256. In one embodiment, storage device 135A may be external to storage controller 110 as part of storage array 130 and may be connected to storage controller 110 over a network or other connection. In other embodiments, storage controller 110 may include different and/or additional components which are not shown to simplify the description. Storage device 135A may include one or more mass storage devices which can include, for example, flash memory or solid-state drives (SSDs). Memory 235 may include for example, random-access memory (RAM); dynamic random-access memory (DRAM); erasable programmable memory (e.g., EPROM and EEPROM); flash memory; or any other type of storage medium. In one embodiment, storage device 135A includes volatile memory 235, such as DRAM, and non-volatile data blocks 256, such as flash blocks or other persistent data blocks.

In one embodiment, client interface 242 manages communication with client devices or applications in storage system 100, such as initiator devices 115 or 125, or applications within storage controller 110. Client interface 242 can receive I/O requests to access data blocks 256 on storage device 135A from an initiator application 112 or 122 over network 120. In one embodiment, the I/O request includes a request to write new data to storage device 135A. After the write is performed, client interface may provide a notification to initiator device 115 or 125 over network 120 indicating that the write was successfully performed.

In one embodiment, data structure interface 244 interacts with data structure 254 in memory 235 on storage device 135A. In response to client interface 242 receiving a write request, for example, data structure interface 244 may access data structure 254 (e.g., a dynamic table) comprising block metadata for each of data blocks 256 on storage device 135A. The block metadata may include an indication of a block type of each data block 256 and an access operation count value for each data block 256. In one embodiment, the access operation count value is a total number of program/erase cycles that have been performed on the block. Using the block type indicator, data structure interface 244 may determine a first data block on storage device 135A which stores a list of deallocated data blocks on storage device 135A. This list may include a block number of each deallocated data block and an access operation count value at which each deallocated data block was deallocated.

In one embodiment, data block interface 246 interacts with data blocks 256 of storage device 135A as part of any data access operations being performed. For example, once data structure interface 244 determines the block storing the list of deallocated data blocks, data block interface 246 may identify a second block of those deallocated blocks from the list, and read an access operation count value associated with the second block from the list. If memory manager 140 ultimately determines that the second block was in fact deallocated, data block interface 246 may perform the requested write operation by overwriting the old data in the second data block with new data. If the allegedly deallocated data block was not actually deallocated (or has since been reallocated), data block interface 246 can remove the second data block from the list stored in the first data block. When memory manager 140 is attempting to locate leading edge data, data block interface 246 can determine whether a particular block was previously labeled as comprising new data. In addition, once memory manager 140 identifies the leading edge data, data block interface 246 can label the data blocks as comprising either new or old data, as appropriate.

In one embodiment, comparison logic 248 performs various calculations and comparisons as part of the operations performed by memory manager 140. For example, to verify that a block appearing on the list of deallocated data blocks is in fact deallocated or to determine whether a block is storing new or old data, comparison logic 248 may compare a first access operation count value associated with the data block from data structure 254 to a second access operation count value associated with the data block from the list of deallocated data blocks stored in one of data blocks 256 (identified by the block type value). If comparison logic 248 determines that the count values match, this indicates that the block has not been reallocated since it was added to the list of deallocated blocks and, thus, can either be labeled as storing old data or can safely be overwritten without losing any critical data. If the count values don't match, however, this indicates that another client has written data to that block and it should be removed from the list of deallocated blocks and/or labeled as comprising new data.

Figure 3:
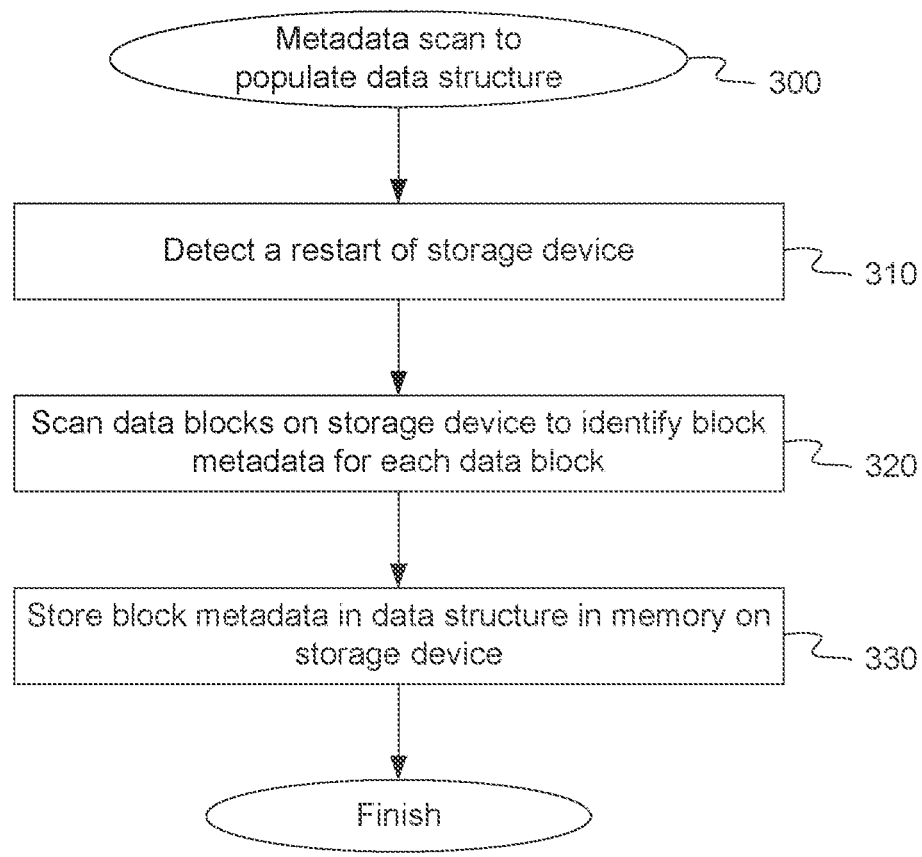
FIG. 3 is a flow diagram illustrating a method for performing a metadata scan to populate a data structure, according to an embodiment.

FIG. 3 is a flow diagram illustrating a method for performing a metadata scan to populate a data structure, according to an embodiment. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. On power-up of the storage device 135A, the method 300 may scan the data blocks 256 to recover the embedded metadata and populate the data structure 254 with the metadata recovered from those blocks. In one embodiment, method 300 may be performed by the firmware 252 of storage device 135A, as shown in FIG. 2.

Referring to FIG. 3, at block 310, method 300 detects a restart of storage device 135A. After an event, such as a sudden power loss or software crash, storage device 135A may be automatically restarted. Firmware 252 can detect the restart and initiate any number of start-up procedures. Storage system 100 is designed to be extremely reliable even in the face of hardware or software failures, including sudden power losses or software crashes. Storage devices 135A-n may be designed with failures in mind, specifically to account for sudden crashes or power loss at any point during the process, and to assure that restarting after such an event is no different than any other restart operation.

At block 320, method 300 scans a plurality of data blocks 256 on storage device 135A to identify block metadata for each of the plurality of data blocks 256. In one embodiment, firmware 252 may scan each of the data blocks 256 to recover the embedded metadata. This metadata may include, for example, an indication of a block type of each of the data blocks 256 and an access operation count value for each of the data blocks 256. In one embodiment, this metadata may be stored in a header section of each individual block 256, so that it can be obtained quickly and efficiently. In one embodiment, the scan is reasonably fast (e.g., taking less than 10 seconds to scan one million or more blocks).

At block 330, method 300 stores the block metadata in data structure 254 stored in memory 235 on storage device 135A, wherein the block metadata is accessible by storage controller 110 coupled to storage device 135A. In one embodiment, data structure 254 comprises a plurality of entries, each of the entries corresponding to a different one of the data blocks 256 on storage device 135A. In one embodiment, data structure 254 maintains an indication of a block type and an access operation count value for each data block. One example of a block type that may be stored in metadata is a "bootstrap data" block. This block type stores data that is needed to restart the system after a power loss or other failure. Since the data blocks 256 may have limited reusability (e.g., approximately three thousand program/erase cycles), this data cannot be stored in the same place since it gets accessed regularly. Since the bootstrap data can be located easily during the metadata scan, it can be located anywhere on storage device 135A.

Data storage on flash follows a simple looking cycle: erase, program; erase, program. Once written or programmed, data is nonvolatile and may be read millions of times. Flash structures have a complex hierarchy (i.e., packages, dies, planes, blocks, pages, and bits). The memory manager 140 described herein operates primarily on the block level. This is because the block is the most common unit of erase and reuse. If a particular flash chip uses 16 MB blocks, then data will be written to flash in 16 MB chunks, and will be discarded in 16 MB chunks. One physical detail of NAND flash that becomes important is that the physical blocks and pages have some "extra" storage beyond the expected powers of two. Thus, a physical 16 KB block may actually contain 19 KB of physical bits. While most of these "extra" bits are consumed by error correction codes, there may be some room left over to store metadata about the block or its contents. Storage system 100 makes use of some of these bits to store metadata alongside any data stored by the controller.

There are a number of management tasks performed by any system that stores data on NAND flash chips. Normally these functions are all performed in SSD firmware and are concealed from the host computer. Flash chips have a limited lifespan, measured in program/erase (PE) cycles. Management software must spread data around such that flash blocks wear more or less evenly across the drive, or premature drive failure may result due to block failures. This may be referred to as "wear leveling." Flash is an imperfect media and blocks may fail spontaneously. Thus, in one embodiment, management software must maintain a bad block list over the lifetime of the drive. In addition, most SSDs support a storage interface that is backwards compatible with hard disks from the last 20+ years, allowing a contiguous range of logical 512 byte sectors that can be overwritten randomly an arbitrary number of times. Firmware supports this interface via a complicated abstraction layer that maps logical addresses to physical flash locations dynamically to provide logical address mapping. In one embodiment, wear leveling and bad block handling are not performed in firmware, but rather are handled within memory manager 140 of storage controller 110. Thus, the logical address feature may be discarded as only physical flash addresses are used.

Figure 4:
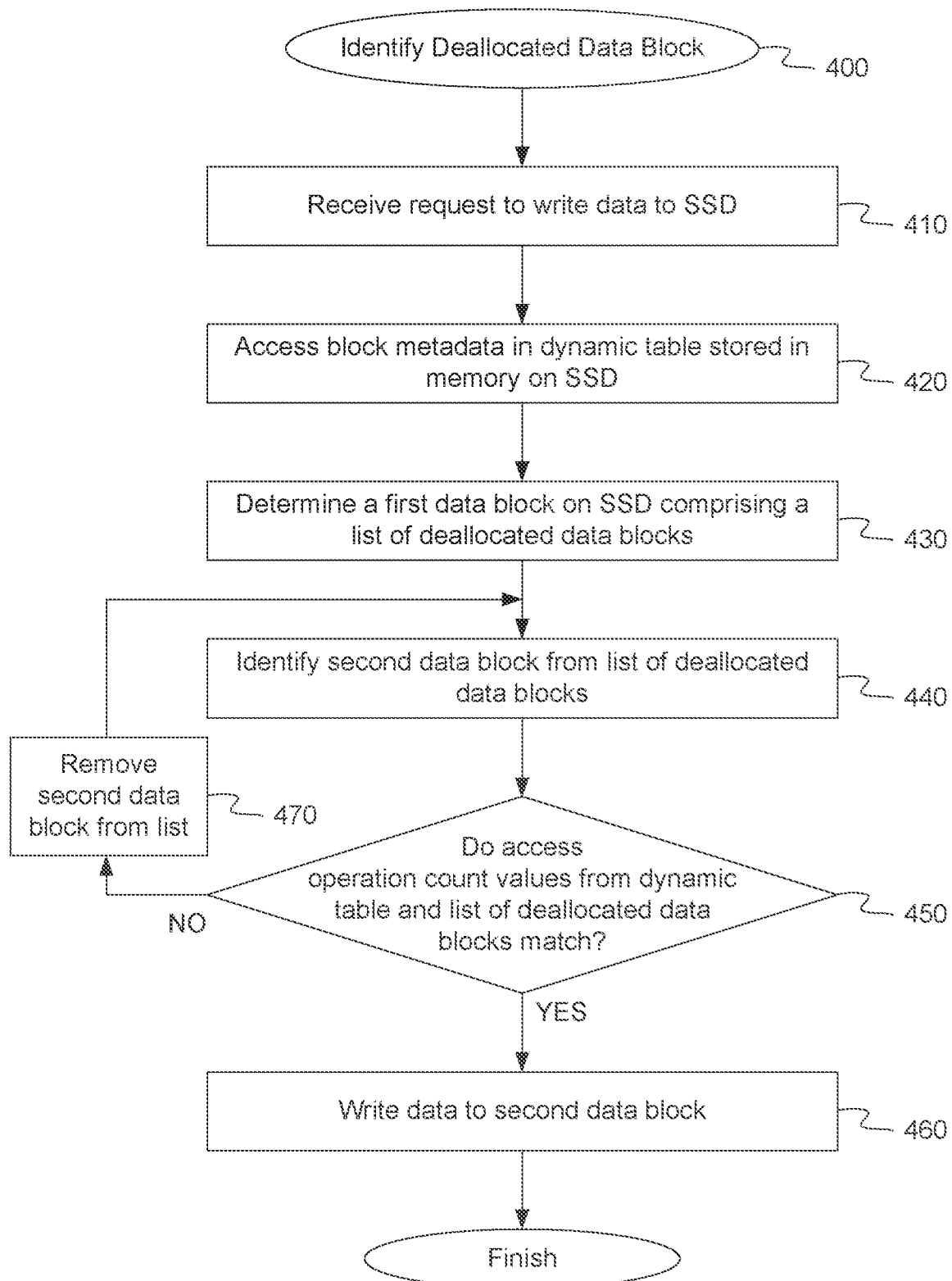
FIG. 4 is a flow diagram illustrating a method for identifying a deallocated data block on a storage device, according to an embodiment.

FIG. 4 is a flow diagram illustrating a method for identifying a deallocated data block on a storage device, according to an embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The method 400 can allow a storage controller to identify deallocated data blocks to allow those blocks to be overwritten without the risk of losing any critical data. In one embodiment, method 400 may be performed by memory manager 140, as shown in FIGS. 1 and 2.

Referring to FIG. 4, at block 410, method 400 receives a request to write data to storage device 135A (e.g., an SSD). In one embodiment, client interface 242 receives the request from an initiator application 112 or 122 over network 120, or from another client application on storage controller 110. The write request may not specify a particular data block on storage device 135A, so it may be up to memory manager 140 to identify a deallocated block. Since data blocks 256 may not be erased until right before they are written, even a block currently storing data may be "deallocated" and, thus, available for writing.

At block 420, method 400 accesses a dynamic table (e.g., data structure 254) stored in memory 235 on storage device 135A, the dynamic table comprising block metadata for each data block 256 on storage device 135A. In one embodiment, data structure interface 244 may access data structure 254 comprising block metadata for each of data blocks 256 on storage device 135A. The block metadata may include an indication of a block type of each data block and an access operation count value for each data block.

At block 430, method 400 determines a first data block on storage device 135A comprising a list of deallocated data blocks on the storage device 135A. In one embodiment, data structure interface 244 determines the first data block from the dynamic table based on the indication of the block type of the first data block. Using the block type indicator stored in the dynamic table, data structure interface 244 may determine a first data block on storage device 135A which stores a list of deallocated data blocks on storage device 135A. This list may include a block number of each deallocated data block and an access operation count value at which each deallocated data block was deallocated. In one embodiment, this list may be referred to as the "frontier set" and the block where it is stored may be given a special block type. In one embodiment, the frontier set is identified and read once when storage device 135A is started-up (or restarted), and the list of deallocated blocks is stored and their corresponding operation count values are stored in memory 235.

At block 440, method 400 identifies a second data block from the list of deallocated data blocks on the storage device 135A. In one embodiment, data block interface 246 accesses the first block on storage device 135A identified at block 430 from the dynamic table. Data block interface 246 may identify a second block of those deallocated blocks from the list, and read an access operation count value associated with the second block from the list. In one embodiment, the second data block may be identified from the list of deallocated blocks stored in memory 235 some period of time after the frontier set is initially identified at block 430.

At block 450, method 400 compares a first access operation count value associated with the second data block from the dynamic table to a second access operation count value associated with the second data block from the list of deallocated data blocks. In one embodiment, comparison logic 248 compares the first access operation count value to the second access operation count value associated with the data block. If comparison logic 248 determines that the count values match, this indicates that the block has not been reallocated since it was added to the list of deallocated blocks. Thus, at block 460, method 400 writes the requested data to the second data block. In one embodiment, data block interface 246 overwrites the old data stored in the second data block with the newly requested data received at block 410. If the count values do not match, however, this indicates that another client has since written new data to that block. Thus, at block 470, data block interface 246 removes the second data block from the list of deallocated data blocks.

Figure 5:
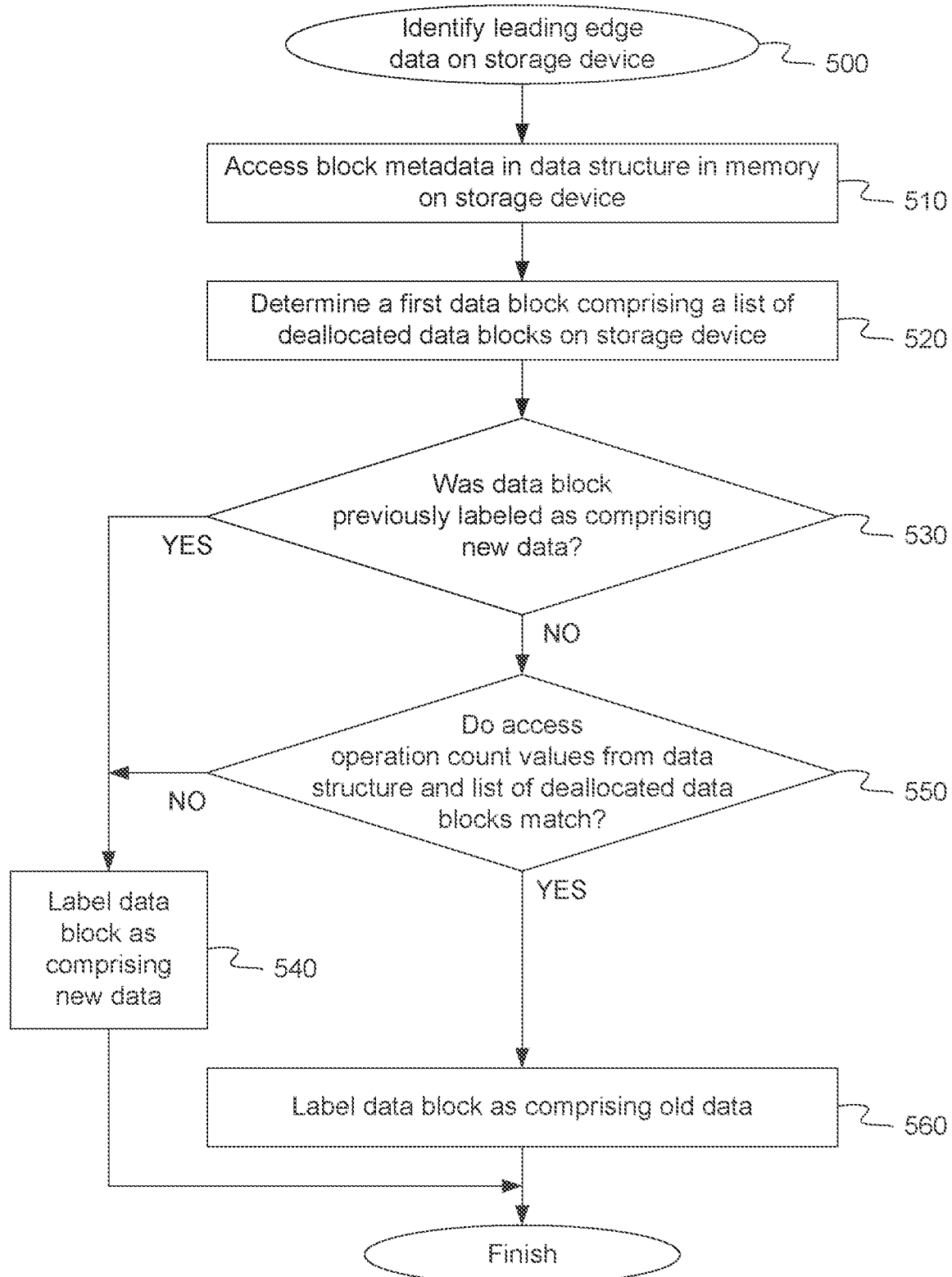
FIG. 5 is a flow diagram illustrating a method for identifying leading edge data on a storage device, according to an embodiment.

FIG. 5 is a flow diagram illustrating a method for identifying leading edge data on a storage device, according to an embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The method 500 can allow a storage controller to identify leading edge data that was most recently written to storage device 135A by a particular storage client. In one embodiment, method 500 may be performed by memory manager 140, as shown in FIGS. 1 and 2.

Referring to FIG. 5, at block 510, method 500 accesses data structure 254 in memory 235 on storage device 135A, the data structure 254 comprising block metadata for each data block 256 on storage device 135A. In one embodiment, data structure interface 244 may access data structure 254 comprising block metadata for each of data blocks 256 on storage device 135A. The block metadata may include an indication of a block type of each data block and an access operation count value for each data block.

At block 520, method 500 determines, from data structure 254, a first data block on storage device 135A comprising a list of deallocated data blocks on storage device 135A. In one embodiment, data structure interface 244 determines the first data block from the data structure 254 based on the indication of the block type of the first data block. Using the block type indicator stored in the data structure 254, data structure interface 244 may determine a first data block on storage device 135A which stores a list of deallocated data blocks on storage device 135A. This list may include a block number of each deallocated data block and an access operation count value at which each deallocated data block was deallocated and a state value indicating whether the block is known to be in use. The state value may be indicated as "boot" or "future," where a boot block is known to be in use (because it includes new data) and a future block was, at the time data structure 254 was populated, not in use (because it includes old data). In one embodiment, this list may be referred to as the "frontier set" and the block where it is stored may be given a special block type. The frontier set represents a snapshot in time and permits a future primary controller to correctly recover the state of the drive (and all the clients' data storage). A newly started primary controller can examine this frontier set, and compare the program/erase counts to those on the drive itself. "Future" blocks will become boot blocks if the program/erase count indicates new writes have occurred. "Boot" blocks will generally stay boot blocks, barring unusual events, such as flash errors, etc.

At block 530, method 500 determines whether a data block on the list of deallocated data blocks was previously labeled as comprising old data. In one embodiment, data block interface 246 reads the data from the first data block where the frontier set itself is stored, locates an entry in the frontier set corresponding to a second data block and reads the state value for that entry. As described above, data blocks on storage device 135A comprising old data may be labeled as "future" blocks in the frontier set and data blocks comprising new data may be labeled as "boot" blocks in the frontier set.

If the block was previously labeled as comprising new data (i.e., labeled as "boot" blocks), at block 540, method 500 maintains the previous new data label. Thus, boot blocks stay labeled boot blocks, regardless of whether they have new writes.

If the block was previously labeled as comprising old data, at block 550, method 500 compares a first access operation count value associated with the deallocated data blocks from the data structure 254 to a second access operation count value associated with the deallocated data block from the list of deallocated data blocks. In one embodiment, comparison logic 248 compares the first access operation count value to the second access operation count value associated with the data block. If comparison logic 248 determines that the first access operation count value associated with the second data block from the data structure does not match the second access operation count value associated with the second data block from the list of deallocated data blocks, this indicates that the block has been written with new data since it was added to the list. Thus, at block 540, method 500 labels the second data block on the list as comprising new data. In one embodiment, data block interface 246 changes the state value in the entry of the frontier set corresponding to the data block to "boot." If the first access operation count value associated with the second data block from the data structure matches the second access operation count value associated with the second data block from the list of deallocated data blocks, however, this indicates that no new data has been written to that block. Thus, at block 560, method 500 labels the second data block on the list as comprising old data. In one embodiment, data block interface 246 maintains the state value in the entry of the frontier set corresponding to the data block as "future."

In one embodiment, standalone blocks are not tracked by the frontier set. Rather, they can be defined as "all the blocks not listed in the frontier set" (or marked bad). These blocks can be enumerated simply by searching the drive tables for blocks with the correct block type that are not covered by the current frontier set. It should also be noted that all newly allocated blocks may come from the list of blocks written in the frontier set. Otherwise, the newly written data would not be detected as a boot block by a future primary controller. Furthermore, because boot blocks are listed in the frontier set, there can be policy on clients with small storage needs that they will never use standalone blocks. This means that any blocks that contain data with that client's block type, but are not listed in the frontier set, have been deallocated, saving clients the bother of sifting through old data and deallocating those blocks.

Periodically, a new frontier set may be constructed and written to flash. This may be desirable if most of the deallocated blocks in the current frontier set have been exhausted. Writing a new frontier set can make additional blocks ready for allocation. In addition, if a particular client has written and then deallocated many blocks, a new frontier set may be created. In one embodiment, deallocations are not made permanent until a new frontier set is written. Thus, completing that write will limit the number of blocks a future primary will discover. This can affect failover time, so it may be advantageous to limit some clients' block usage. Failover includes the transfer of the "primary" designation from one controller to another, which includes the transfer of the functionality of memory manager 140. Furthermore, when some blocks with attractive (i.e., low) program/erase counts have become deallocated, for best wear leveling behavior, the system tries to use the blocks with the lowest program/erase count first. Persisting a new frontier set can make those more attractive blocks available.

A new frontier set may be constructed by selecting some new future blocks from the list of deallocated blocks and adding the list of known boot blocks. Blocks which were formerly boot blocks in the previous frontier set but have since been graduated may not be recorded in the new frontier set. While persisting a new frontier set, the system need not halt all client allocations and writes. The new frontier set is constructed to contain at least a small number of blocks that are also part of the previous frontier set (and are marked as "future" blocks). In this way the system can continue allocating blocks from this overlapping set, knowing that if it crashes or loses power at any time, memory manager 140 can safely start up using either the new set (assuming the new frontier set write completed) or the old set (if the write did not complete). Each new frontier set may be written to a flash block using a "frontier set" block type value. This assists in quickly locating the frontier set.

Because this design does not persist a new frontier set during every state change, there may be an accumulation of changes that have only taken effect inside the controller memory. These changes can be lost if a failover or power loss occurs. It is possible to lose block deallocations and graduations across these events, however, this does not affect the correctness of the controller application, as it is straightforward to simply repeat these actions on the new primary controller. It is also possible to lose a block allocation if the client did not write to the block in question before the failover or restart. In one embodiment, this problem is alleviated as whatever task that intended to write something will be repeated on the new primary controller and may allocate a new block without being aware that a previous primary controller was attempting a similar operation.

In one embodiment, the storage device firmware 252 provides a list of blocks containing data of a particular block type to memory manager 140. This reduces the work required to locate the frontier set, and allows faster primary controller startup. When writing the frontier set, memory manager 140 also takes the unusual step of physically erasing old copies of frontier sets. This allows faster startup time by ensuring that controller 110 does not have to sift through many old frontier sets looking for the current one. To ensure correct behavior across a surprise block failure, frontier sets may be written to at least two physical locations, preferably spread across different failure domains (e.g. flash dies) to minimize the chance that both fail simultaneously. In one embodiment, the encryption capabilities of storage device firmware 252 are customized such that the data structures needed during startup (e.g. the frontier set) can be written unencrypted, and most client data can be written encrypted.

Figure 6:
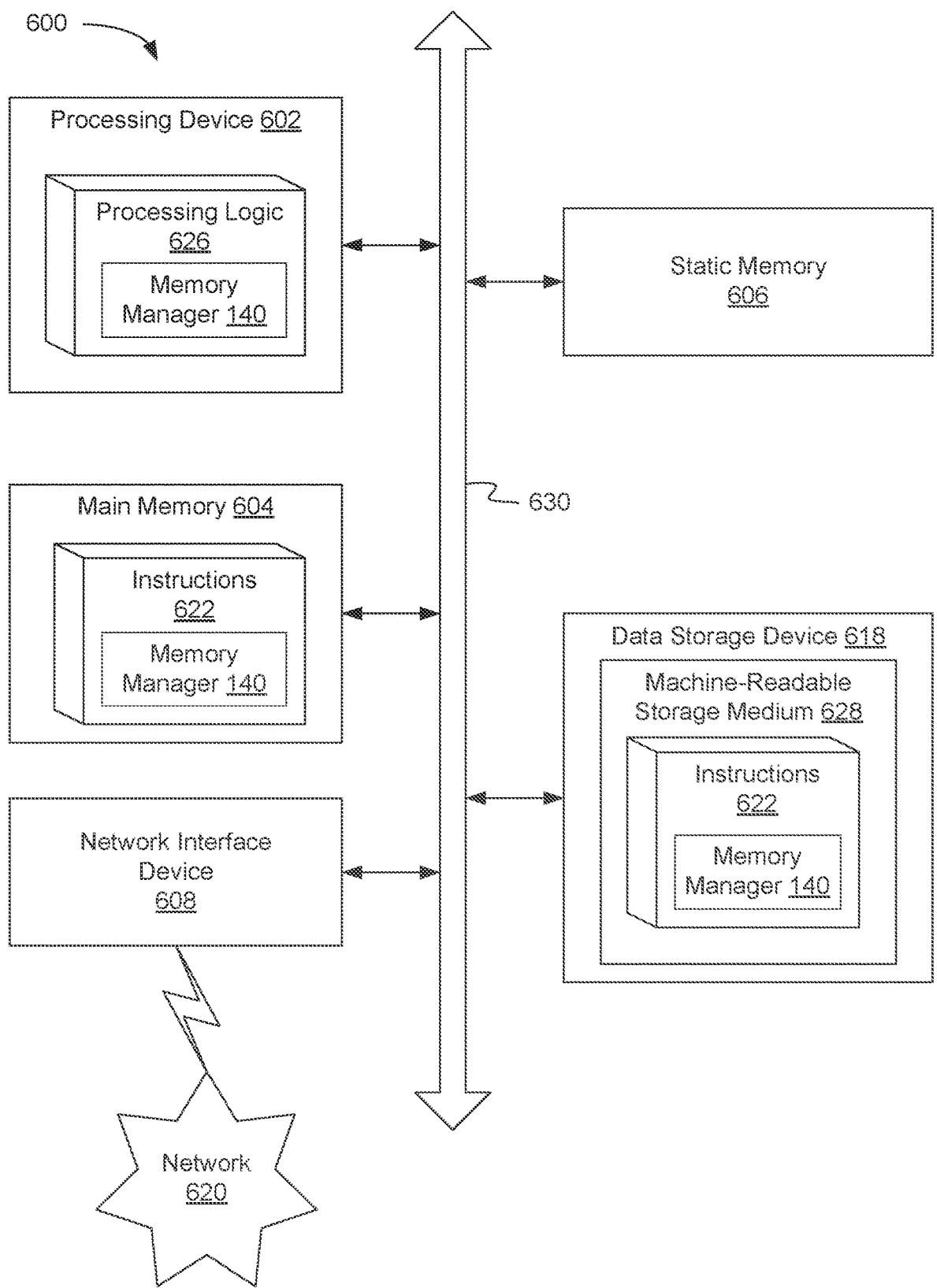
FIG. 6 is a block diagram illustrating an exemplary computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as storage controller 110 running memory manager 140 or of a client, such as initiator devices 115 or 125.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Data storage device 618 may be one example of any of the storage devices 135A-n in FIGS. 1 and 2. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of memory manager 140 shown in FIGS. 1 and 2, or of initiator application 112 or 122, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute virtual copy logic 140 or initiator application 112 or 122. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for efficient flash management for multiple controllers, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A system comprising:
   a plurality of storage devices; and
   a storage controller coupled to the plurality of storage devices, the storage controller comprising a processing device, the processing device configured to:
   identify a data structure containing metadata associated with a data block of the plurality of storage devices;
   identify a list of deallocated data blocks for the plurality of storage devices;
   compare an access operation count value for the data block associated with the data structure with an access operation count value for the data block associated with the list of deallocated blocks; and
   determine whether the data block is available for writing additional data based on comparison of access operation count values.

2. The system of claim 1, wherein identification of the data structure containing metadata is responsive to a restart of the system.

3. The system of claim 1, wherein the data structure containing metadata is a dynamic table comprising block metadata for each data block on the storage device.

4. The system of claim 3, wherein the block metadata comprises an indication of a block type of each data block on the storage device and a corresponding program erase count value for each data block on the storage device.

5. The system of claim 4, wherein the data block is identified from the dynamic table based on the indication of the block type of the data block.

6. The system of claim 1, wherein the data structure containing metadata is a frontier set.

7. The system of claim 1, wherein the processing device is configured to remove the data block from the list of deallocated data blocks in response to the access operation counts not matching.

8. A method comprising:
   identifying a data structure containing metadata associated with a data block of the plurality of storage devices;
   identifying a list of deallocated data blocks for the plurality of storage devices;
   comparing an access operation count value for the data block associated with the data structure with an access operation count value for the data block associated with the list of deallocated blocks; and
   determining whether the data block is available for writing additional data based on comparison of access operation count values.

9. The method of claim 8, wherein identification of the data structure containing metadata is responsive to a restart of the system.

10. The method of claim 8, wherein the data structure containing metadata is a dynamic table comprising block metadata for each data block on the storage device.

11. The method of claim 10, wherein the block metadata comprises an indication of a block type of each data block on the storage device and a corresponding program erase count value for each data block on the storage device.

12. The method of claim 11, wherein the data block is identified from the dynamic table based on the indication of the block type of the data block.

13. The method of claim 8, wherein the data structure containing metadata is a frontier set.

14. The method of claim 8, wherein the processing device is configured to remove the data block from the list of deallocated data blocks in response to the access operation counts not matching.

15. A non-transitory computer readable storage medium comprising instructions which, when executed by a processing device, cause the processing device to:
   identify a data structure containing metadata associated with a data block of the plurality of storage devices;
   identify a list of deallocated data blocks for the plurality of storage devices;
   compare an access operation count value for the data block associated with the data structure with an access operation count value for the data block associated with the list of deallocated blocks; and
   determine whether the data block is available for writing additional data based on comparison of access operation count values.

16. The non-transitory computer readable storage medium of claim 15, wherein identification of the data structure containing metadata is responsive to a restart of the system.

17. The non-transitory computer readable storage medium of claim 15, wherein the data structure containing metadata is a dynamic table comprising block metadata for each data block on the storage device.

18. The non-transitory computer readable storage medium of claim 17, wherein the block metadata comprises an indication of a block type of each data block on the storage device and a corresponding program erase count value for each data block on the storage device.

19. The non-transitory computer readable storage medium of claim 18, wherein the data block is identified from the dynamic table based on the indication of the block type of the data block.

20. The non-transitory computer readable storage medium of claim 15, wherein the data structure containing metadata is a frontier set.

* * * * *